(12) United States Patent
Vaidya et al.

(10) Patent No.: US 11,676,175 B1
(45) Date of Patent: Jun. 13, 2023

(54) MULTIPLE IDENTIFIERS FOR USER ACCOUNTS

(71) Applicant: Meta Platforms, Inc., Menlo Park, CA (US)

(72) Inventors: Shlok Vaidya, Fremont, CA (US); Sagar Sanjay Chordia, Sunnyvale, CA (US); Tuna Toksoz, Mountain View, CA (US); Manish Singhal, Seattle, WA (US); Wei Wei, Sunnyvale, CA (US); Yu Wang, Bellevue, WA (US); Yu Pang, Shoreline, WA (US); Connor Foody, Menlo Park, CA (US); Manav Kedia, San Francisco, CA (US); Jinghao Yan, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 6 days.

(21) Appl. No.: 17/408,072

(22) Filed: Aug. 20, 2021

(51) Int. Cl.
    *G06Q 30/00* (2023.01)
    *G06Q 30/0251* (2023.01)
    *H04L 67/306* (2022.01)
    *H04L 67/50* (2022.01)

(52) U.S. Cl.
    CPC ....... *G06Q 30/0255* (2013.01); *H04L 67/306* (2013.01); *H04L 67/535* (2022.05)

(58) Field of Classification Search
    None
    See application file for complete search history.

(56) References Cited

U.S. PATENT DOCUMENTS

| | | | |
|---|---|---|---|
| 2013/0097245 A1* | 4/2013 | Adarraga | H04L 65/403 709/204 |
| 2014/0222926 A1* | 8/2014 | Allen | G06F 16/337 709/204 |
| 2018/0247344 A1* | 8/2018 | Feng | G06Q 50/01 |
| 2019/0166498 A1* | 5/2019 | Boettcher | H04M 1/66 |
| 2019/0188752 A1* | 6/2019 | Jones | G06Q 30/0244 |
| 2020/0366678 A1* | 11/2020 | Muth | H04L 63/0815 |
| 2021/0233141 A1* | 7/2021 | Ghamsari | G06Q 30/0627 |
| 2022/0318250 A1* | 10/2022 | Qiu | G06F 11/3075 |

* cited by examiner

*Primary Examiner* — Matthew T Sittner
(74) *Attorney, Agent, or Firm* — McDermott Will & Emery LLP (57) ABSTRACT

Methods, systems, and storage media for assigning multiple identifiers to user accounts are disclosed. Exemplary implementations may: receive an indication of an event; associate the event with a user; associate the user with at least a first account identifier of a plurality of accounts of the user; associate the user with at least a second account identifier of the plurality of accounts of the user, the second account identifier different than the first account identifier; add at least one of the first account identifier or the second account identifier to a custom audience relating to the event; target the custom audience through directed advertising; and deliver advertisements to the custom audience.

18 Claims, 7 Drawing Sheets

|   | Best User | Best IG | Best FB | Multi-ID Output | Comment |
|---|---|---|---|---|---|
| 1 | FBID | NULL | FBID | FBID | |
| 2 | FBID | Hard Match IGID | FBID | FBID | |
| 3 | FBID | Non Hard Match IGID | FBID | FBID, IGID | Multi-ID |
| 4 | Hard Match IGID | Hard Match IGID | FBID (Hard Match From IGID) | FBID | |
| 5 | Non Hard Match IGID | Non Hard Match IGID | FBID | FBID, IGID | Multi-ID |
| 6 | IGID | IGID | NULL | IGID | |
| 7 | NULL | NULL | NULL | NULL | |

MULTIPLE IDENTIFIERS FOR USER ACCOUNTS

TECHNICAL FIELD

The present disclosure generally relates to account identifiers, and more particularly to multiple identifiers for user accounts.

BACKGROUND

Social media includes interactive technologies that allow for the creation, sharing, and/or exchanging of information. Users may register for social media accounts so that they may share user-generated content, such as posts, comments, photos, videos, and the like, with other users. Users may also create profiles that include information about the user. As a result, social media has become a popular way for people to interact with each other on the Internet. However, users may be registered for multiple accounts at a time on various social media platforms, and so it becomes difficult to determine unique users apart from each other.

BRIEF SUMMARY

The subject disclosure provides for systems and methods for improving an advertising experience for users on a social media platform based on multiple user identifiers. According to aspects a user may be assigned/matched with multiple account identifiers for directed advertising.

One aspect of the present disclosure relates to a method for assigning multiple identifiers to user accounts. The method may include receiving an indication of an event. The method may include associating the event with a user. The method may include associating the user with at least a first account identifier of a plurality of accounts of the user. The method may include associating the user with at least a second account identifier of the plurality of accounts of the user, the second account identifier different than the first account identifier. The method may include adding at least one of the first account identifier or the second account identifier to a custom audience relating to the event. The method may include targeting the custom audience through directed advertising. The method may include delivering advertisements to the custom audience.

Another aspect of the present disclosure relates to a system configured for assigning multiple identifiers to user accounts. The system may include one or more hardware processors configured by machine-readable instructions. The processor(s) may be configured to receive an indication of an event. The processor(s) may be configured to associate the event with a user. The processor(s) may be configured to associate the user with at least a first account identifier of a plurality of accounts of the user. The processor(s) may be configured to associate the user with at least a second account identifier of the plurality of accounts of the user, the second account identifier different than the first account identifier. The processor(s) may be configured to add at least one of the first account identifier or the second account identifier to a custom audience relating to the event. The processor(s) may be configured to target the custom audience through directed advertising. The processor(s) may be configured to deliver advertisements to the custom audience.

Yet another aspect of the present disclosure relates to a non-transient computer-readable storage medium having instructions embodied thereon, the instructions being executable by one or more processors to perform a method for assigning multiple identifiers to user accounts. The method may include receiving an indication of an event. The method may include associating the event with a user. The method may include associating the user with at least a first account identifier of a plurality of accounts of the user. The method may include associating the user with at least a second account identifier of the plurality of accounts of the user, the second account identifier different than the first account identifier. The method may include adding at least one of the first account identifier or the second account identifier to a custom audience relating to the event. The method may include targeting the custom audience through directed advertising. The method may include delivering advertisements to the custom audience.

Still another aspect of the present disclosure relates to a system configured for assigning multiple identifiers to user accounts. The system may include means for receiving an indication of an event. The system may include means for associating the event with a user. The system may include means for associating the user with at least a first account identifier of a plurality of accounts of the user. The system may include means for associating the user with at least a second account identifier of the plurality of accounts of the user, the second account identifier different than the first account identifier. The system may include means for adding at least one of the first account identifier or the second account identifier to a custom audience relating to the event. The system may include means for targeting the custom audience through directed advertising. The system may include means for delivering advertisements to the custom audience.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Social media includes interactive technologies that allow for the creation, sharing, and/or exchanging of information. Users may register for social media accounts so that they may share user-generated content, such as posts, comments, photos, videos, and the like, with other users. Users may also create profiles that include information about the user. As a result, social media has become a popular way for people to interact with each other on the Internet. However, users may be registered for multiple accounts at a time on various social media platforms, and so it becomes difficult to determine unique users apart from each other.

The subject disclosure provides for systems and methods for improving an advertising experience for users on a social media platform based on multiple user identifiers. According to aspects a user may be assigned/matched with multiple account identifiers for directed advertising.

The disclosed system addresses a problem in traditional social media tied to computer technology, namely, the technical problem of providing relevant advertising to users. The disclosed system solves this technical problem by providing a solution also rooted in computer technology, namely, by providing for the ability to assign/match users with multiple account identifiers for directed advertising. The disclosed subject technology further provides improvements to the functioning of the computer itself because it reduces processing and bandwidth costs associated with conventional directed advertising technology.

According to aspects, data may be shared across a Family of Applications (FoA) based on user consent. For example, the FoA may include a first application and a second application that are related to each other. The second application may be different from the first application. The first application and the second application may share data and information with each other based on user consent. For example, a user having accounts on both the first application and the second application may consent to explicitly link (e.g., hard match) their accounts and share data between them. A user may have multiple different accounts on multiple different applications because each account may serve a different purpose. For example, some accounts may be personal, while other accounts may be professional (e.g., offer professional services, etc.).

According to aspects, when a user having multiple different accounts on multiple different applications does not explicitly link those accounts, rather than being hard matched, those accounts may instead be soft matched based on user details (e.g., user email, phone number, address, personal information, etc.). In this way, directed advertising may be provided to multiple accounts that are either hard matched or soft matched, so that advertising efforts are not unnecessarily duplicated, resulting in a more efficient directed advertising experience.

According to aspects, having clean separation of profiles for advertising is advantageous because each account can make their own decisions (e.g., regarding offsite activities). This also greatly simplifies the directed advertising system and reduces onboarding time and effort, while also maintaining directed advertising services, keeping privacy, and simplifying communications. Additional advantages include proactively addressing many upcoming compliance issues and simplifying existing logic intended to patch design limitations.

According to aspects, an offsite event may be associated with multiple accounts, and each account can make their own decisions without cross sharing the data. For example, an offsite event may be an event that occurs outside of the FoA, such as when a user navigates to a retailer's website through a web navigator.

According to aspects, onsite events may be associated with a native identifier (ID) that is decoupled from any soft matches and/or hard matches with other accounts. This will further enhance profile separation and allow the system to be more configurable to support any data policy changes moving forward. For example, an onsite event may be an event that occurs within the FoA, such as when a user navigates within an application of the FoA.

According to aspects, hard matched and/or soft matched accounts may be associated with a single user account that may represent multiple user accounts at once. This may implicitly merge information from multiple accounts so that it relates to only one user.

Figure 1:
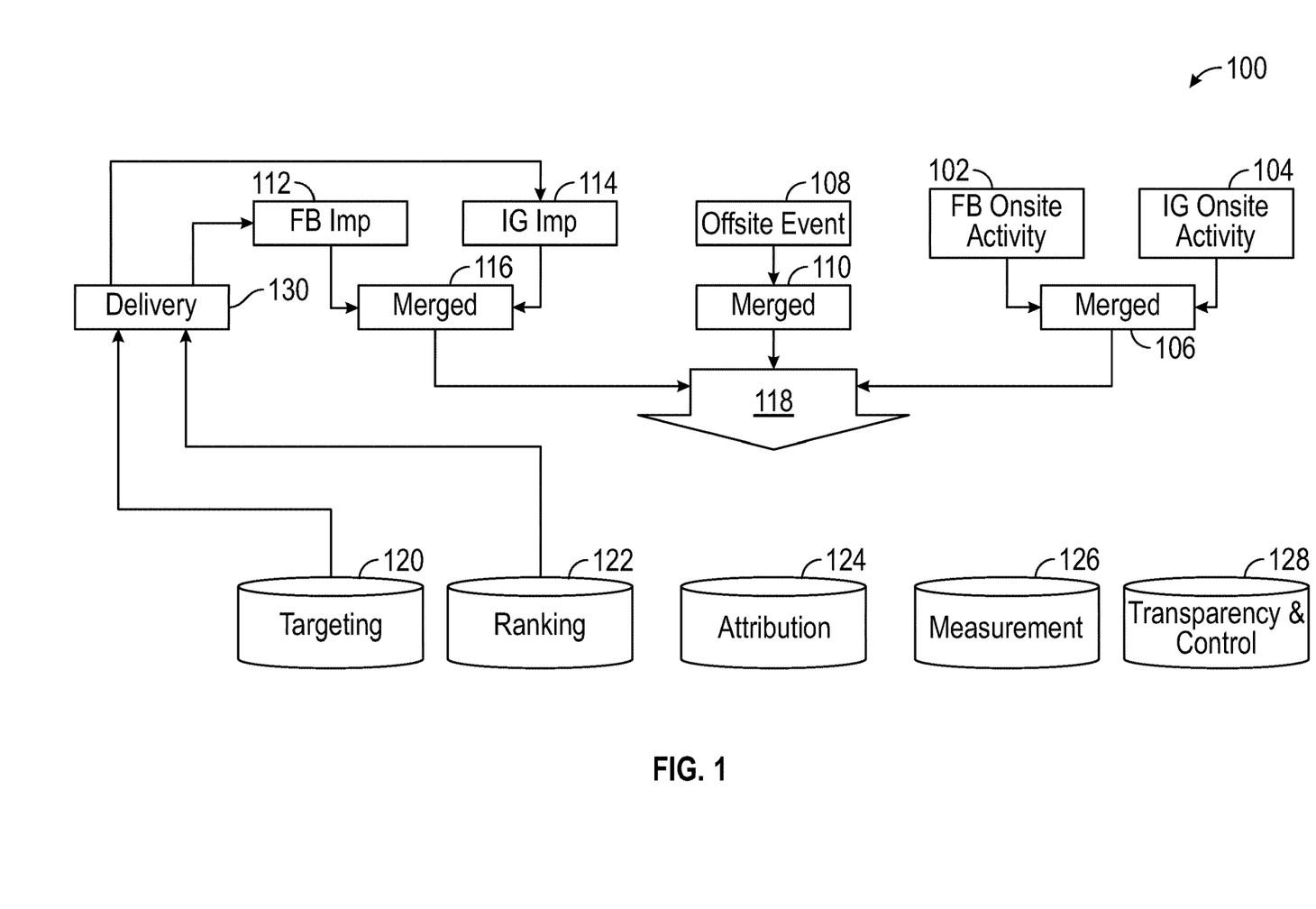
FIG. 1 illustrates merging of separate accounts, according to certain aspects of the present disclosure.

FIG. 1 shows a diagram 100 illustrating merging of separate accounts, according to certain aspects of the present disclosure. For example, a user may have a first account 102 and a second account 104. The first account 102 and the second account 104 may be from the same FoA. In an implementation, the first account 102 may be a FACEBOOK (FB) account, and the second account may be an INSTAGRAM (IG) account. It is understood that these accounts are exemplary only, and other accounts from the same FoA may also be included, such as WHATSAPP, OCULUS, etc.

According to aspects, onsite activity of the first account 102 and onsite activity of the second account 104 may be tracked separately, and merged 106 to combine the tracking data. For example, the onsite activity of the first account 102 may include user activity within a first application (e.g., FACEBOOK) of the first account 102. The user may be logged into the first account 102 and may browse/navigate within the first application. Similarly, the onsite activity of the second account 104 may include user activity within a second application (e.g., INSTAGRAM) of the second account 104. The user may be logged into the second account 104 and may browse/navigate within the second application. Because the user is logged in to both accounts when browsing/navigating, their actions may be tracked by the first application and the second application accordingly, and subsequently merged 106.

According to aspects, offsite events 108 may be tracked and merged 110 with the other merged 106 data. For example, the offsite events 108 may include actions performed by the user outside of either the first application and/or the second application.

According to aspects, the user may have a third account 112 and a fourth account 114. For example, the third account 112 (e.g., a second FACEBOOK account) may be another account that is different from the first account 102 (e.g., a first FACEBOOK account). The fourth account 114 (e.g., a second INSTAGRAM account) may be another account that is different from the second account 104 (e.g., a first INSTAGRAM account). In an implementation, the first account 102 may be hard or soft matched with the third account 112, and the second account 104 may be hard or soft matched with the fourth account 114. User activity on the third account 112 and the fourth account 114 may be tracked and merged 116.

According to aspects, the merged data 106, 110, and 116 may all be merged together 118. In this way, information from single accounts may be propagated to downstream systems for targeting 120, ranking 122, attribution 124, measurement 126, and transparency and control 128. In an implementation, the merged data 118 may be utilized to generate and deliver 130 targeted advertising to the user. Due to the account level aggregation and the loss of relevant annotations, the downstream systems may not un-merge IDs, and so it may be difficult to determine an account origin of impressions and offsite/onsite events.

According to aspects, an improved advertising experience may be provided to users having multiple accounts on multiple applications by using multiple identifiers. For example, each user account may be treated as a first class citizen, regardless of which application it is associated with from the FoA, which improves user matching, targeting, ranking, etc. As a result, the system is flexible and can have multiple IDs (e.g., FB ID and IG ID, and the system can design which system to use). Ranking features can be stored on a native ID (e.g., use IG ID for IG and FB ID for FB). In this way, user tracking information is not double counted, and increases efficiency of directed/targeted advertising delivery.

Figure 2:
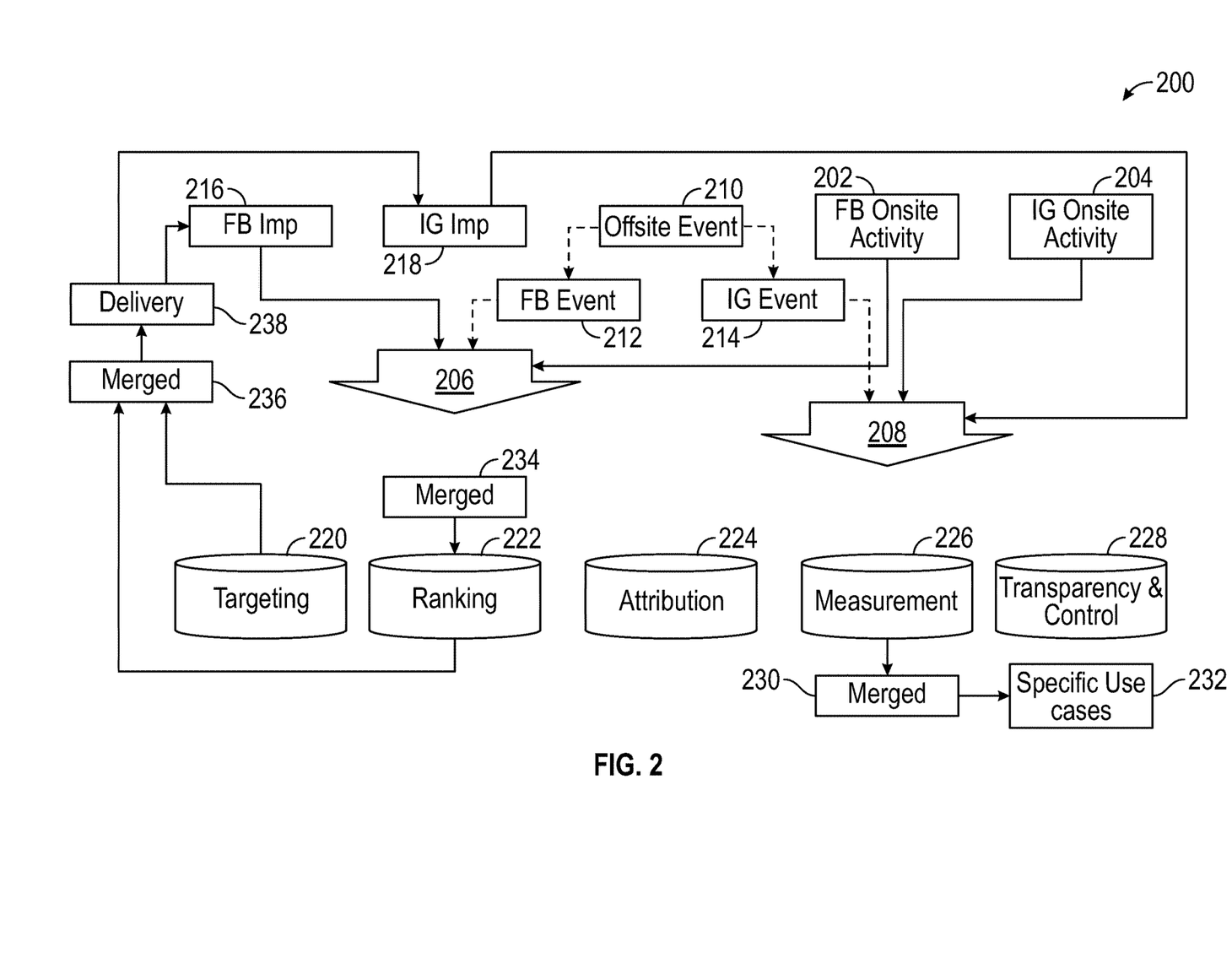
FIG. 2 illustrates separation of account profiles, according to certain aspects of the present disclosure.

FIG. 2 shows a diagram 200 illustrating separation of account profiles, according to certain aspects of the present disclosure. For example, a user may have a first account 202 (e.g., a first FACEBOOK account) and a second account 204 (e.g., a first INSTAGRAM account). User onsite activity of the first account 202 may be tracked separately from user onsite activity of the second account 204. In an implementation, the user onsite activity of the first account 202 may be tracked in a first grouping 206, and the user onsite activity of the second account 204 may be tracked in a second grouping 208. For example, the first grouping 206 may be for FACEBOOK activity, and the second grouping 208 may be for INSTAGRAM activity. It is understood that activity may be tracked for accounts from any applications of the FoA, including, but not limited to, WHATSAPP, OCULUS, etc.

According to aspects, the onsite activity of the first account 202 may include user activity within a first application (e.g., FACEBOOK) of the first account 202. The user may be logged into the first account 202 and may browse/navigate within the first application. Similarly, the onsite activity of the second account 204 may include user activity within a second application (e.g., INSTAGRAM) of the second account 204. The user may be logged into the second account 204 and may browse/navigate within the second application. Because the user is logged in to both accounts when browsing/navigating, their actions may be tracked by the first application and the second application for grouping into either the first grouping 206 or the second grouping 208.

According to aspects, offsite events 210 may be determined to be either related to a first account type 212 (e.g., a first type account) or a second account type 214 (e.g., a second type account). For example, the offsite events 210 may include actions performed by the user outside of either a first application related to the first account 202 and/or a second application related to the second account 204. In an implementation, the offsite events 210 related to the first account type 212 may be included in the first grouping 206, and the offsite events 210 related to the second account type 214 may be included in the second grouping 208.

According to aspects, the user may have a third account 216 and a fourth account 218. For example, the third account 216 (e.g., a second FACEBOOK account) may be another account that is different from the first account 202 (e.g., the first FACEBOOK account). The fourth account 218 (e.g., a second INSTAGRAM account) may be another account that is different from the second account 214 (e.g., the first INSTAGRAM account). In an implementation, the first account 202 may be hard or soft matched with the third account 216, and the second account 204 may be hard or soft matched with the fourth account 218. User activity on the third account 216 may be included in the first grouping 206, and user activity on the fourth account 218 may be included in the second grouping 218. In this way, all of the user activity may be kept separated based on whether the activity is associated with a first type account (e.g., FACEBOOK account) or a second type account (e.g., INSTAGRAM account).

According to aspects, the data in the first grouping 206 and/or the second grouping 208 may be utilized for targeting 220, ranking 222, attribution, 224, measurement 226, and/or transparency and control 228. In an implementation, the measurement 226 may merge 230 the data from the first grouping 206 and the second grouping 208 for specific use cases 232.

According to aspects, the data from the first grouping 206 and the second grouping 208 may be merged 234 for the ranking 222. In an implementation, the ranking 222 and targeting 220 may merge 236 data for determining delivery 238 of targeted/directed advertising to each of the third account 216 and/or the fourth account 218. In this way, the user may receive an improved and uniform advertising experience regardless of which account the user is logged into. This also simplifies the process of generating and delivering targeted/directed advertising, which improves computing performance.

According to aspects, instead of associating the user accounts with a single account, it may be defaulted to keep the associated FB and IG events separate inside an advertisement delivery system. For example, the data may be merged only when it is utilized for specific use cases.

According to aspects, multiple accounts may be assigned to a single event for offsite events 210. It is understood that although only one FB and one IG account is illustrated to be assigned per offsite event, this scope may be expanded to include multiple FB and IG accounts belonging to the same user. In this way, the events for each individual account may be processed and allow for independent advertisement use/delivery decisions.

According to aspects, both the FB and IG accounts may be added into a custom audience for targeting 220. In an implementation, the ranking 222 may allow for each event (e.g., user activity) to be separately added to features for each account. Additionally, mismatched opt-in/out states may be handled optimally. For example, if the user has opted out on their FB account (e.g., not hard matched through FB account), the event can still be associated with the user's IG account if they opted-in on their IG account (e.g., hard matched through IG account).

According to aspects, if the user clears their FB account history, their IG account history will not need to be cleared. For example, history may be cleared on a per-account basis and offsite event history may be displayed on a per-account basis without the complication of merged FB and IG data. In an implementation the events may be associated with the FB and IG accounts separately through the transparency and controls 228. As a result, the disclosed ads profile separation framework makes privacy related compliance simpler and precise. The described aspects would also allow for native ID impression logging and so attributions 224 are not missed.

According to aspects, onsite events 202, 204 may be logged using native identifiers (IDs), and thus do not rely on hard matches. This removes the dependency of the source annotation, such that even after the data is aggregated (e.g., annotations are lost), the origin of the data would still be known. This simplifies the transparency and control 228 functions and also saves on processing of many ID conversions.

According to aspects, identity matching may be performed with profile separation, as described herein. For example, an offsite identity matching system may clearly separate the FB and IG matching process. This provides for the ability to match the FB and/or IG accounts independently and send them separately downstream.

According to aspects, multiple identifiers (multi-ID) may be utilized for targeting 220 ads to users. For example, FB accounts may utilize hard matched IG IDs to fetch (e.g., deliver 238) ads. It is understood that the disclosed ads profile separation framework may support all applications in the FoA, including, but not limited to, WHATSAPP, OCULUS, etc.

According to aspects, a diverse set of accounts and profiles belonging to the same user (e.g., multiple FB accounts and IG accounts) may be supported. For example, the disclosed ads profile separation framework may accommodate a wide variety of products in the FoA, as uniqueness of accounts and profiles are better reflected/preserved in through advertisement behaviors and interactions.

According to aspects, any event may be a pixel event. For example, pixel events may include actions that occur on an electronic device (e.g., on a website, mobile application, etc.). Furthermore, pixel events may be utilized to log conversions, optimize for conversions, and build audiences.

According to aspects, an offsite event may include any pixel event that is fired by a person. As a result, the offsite event may correspond to the actions of one person. Additionally, that one person may have many accounts. In an implementation, offsite events could belong to a FB user and an IG user. In such cases, the event may be treated independently and equally for the FB user and the IG user.

According to aspects, a same offsite event may be duplicated to two events. For example, one duplicate event may be for FACEBOOK, and the other duplicate event may be for INSTAGRAM. In an implementation, offsite signals may be matched to an FB user and an IG user independently, without soft linking involved.

Figure 3:
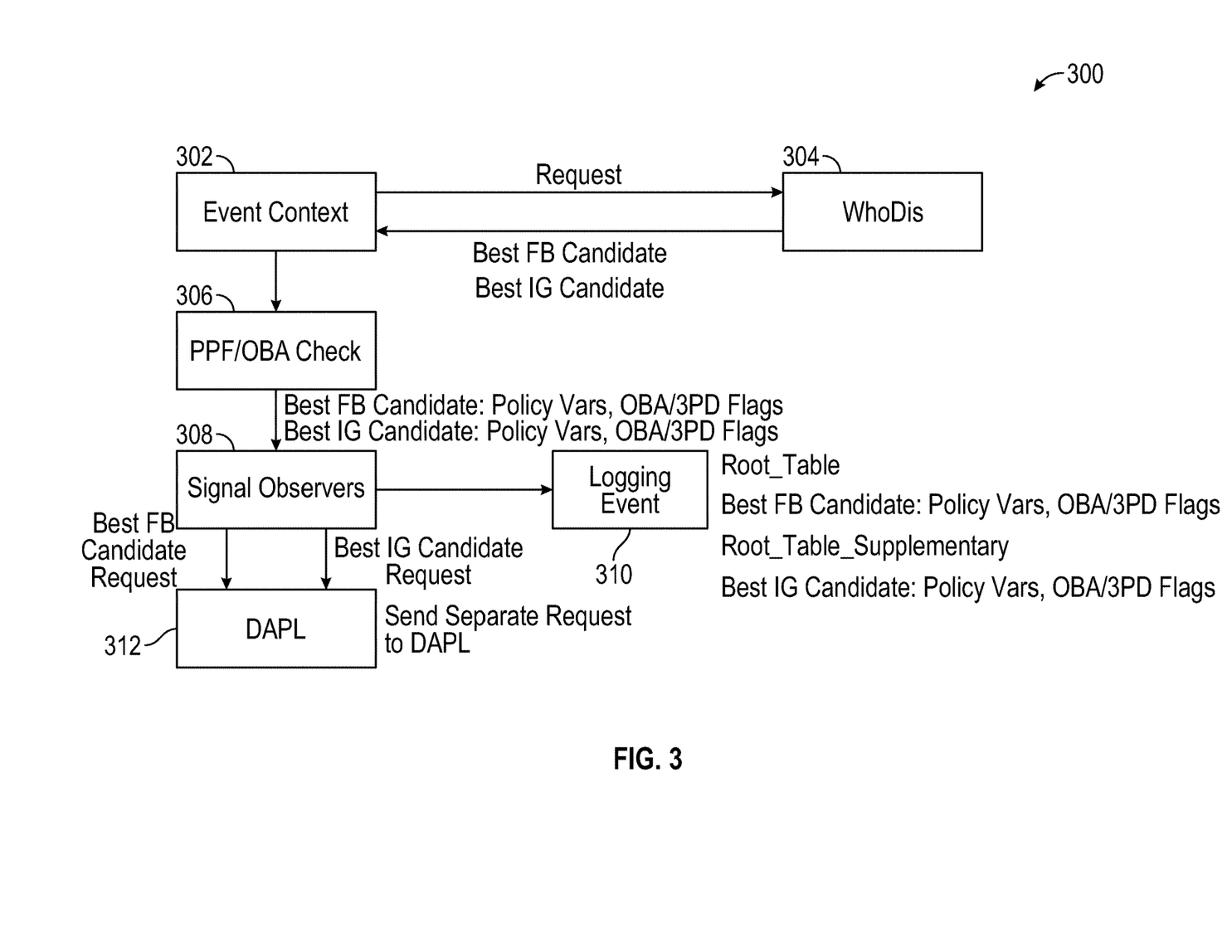
FIG. 3 illustrates an exemplary candidate selection flow, in accordance with one or more implementations.

FIG. 3 illustrates an exemplary candidate selection flow 300, in accordance with one or more implementations. According to aspects, a first user (e.g., a FACEBOOK user) having a first account (e.g., a FACEBOOK account) uses a first application (e.g., a FACEBOOK application) and a second user (e.g., an INSTAGRAM user) having a second account (e.g., an INSTAGRAM account) uses a second application (e.g., an INSTAGRAM application) on the same device. As a result, they share the same device ID. The first user and the second user also may not have their accounts hard linked to each other. According to aspects, the first account and the second account may belong to the same person, or they may belong to different people. In an implementation, an application event occurs on the device that is fired back from a third party application (e.g., a marketplace/retailer application, or the like). According to aspects, this application event may be matched to the first user and the second user. The first user and the second user are added to a custom audience. In this way, an advertiser may retarget the first user and/or the second user based on the custom audience.

According to aspects, the selection flow 300 may begin with an event context 302. For example, the event context 302 may utilize signals to find a list of candidates 304 based on identifiers. If a first identifier (e.g., an IGID) is hard matched to a user, a second identifier (e.g., a FBID) that is hard matched to the user may be added to the candidate list 304. In an implementation, due to the backward compatibility, the hard matched IGID may be converted to a hard matched FBID first. Then, the hard matched IGID may be added back to the candidate list 304 in a later stage. In the final candidate list 304, for the given hard matched IGID, it should have the FBID that was converted from the hard matched IGID.

According to aspects, a best user (e.g., a best FB user and/or best IG user) for the offsite events may be determined based on the list of candidates. The best user may include a primary ID in an event based table. Based on the IGID and FBID match type (e.g., hard matched or non-hard matched user) to determine a multi-ID output.

According to aspects, an opt-out status 306 (e.g., privacy controls for each user/account) is independently checked for each user. Signal observers 308 may communicate logging events 310, and a determined multi-ID is sent downstream to a matching engine 312.

According to aspects, FB users and IG users may be independently matched by offsite signals. The FB user may not be hard/soft matched with the IG user. The IG user may also not be reverse matched with the FB user. For offsite events belonging to IG hard matched users, a hard matched FB profile may be determined for the event. In an implementation, native IDs may be used everywhere except for the hard matched user. For example, only the hard matched IGID would be converted to an FBID. Otherwise, the native IGID may be output downstream.

Figure 4:
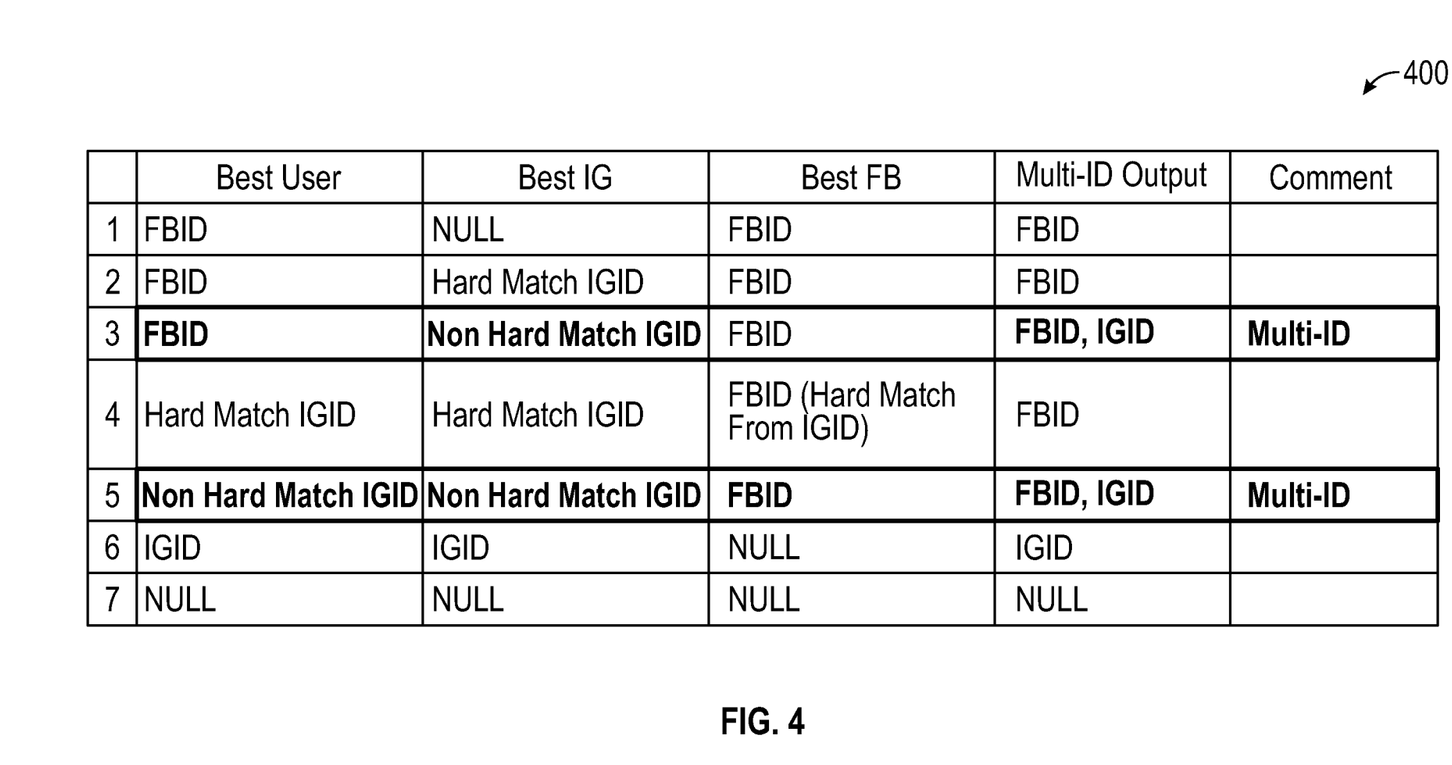
FIG. 4 illustrates an exemplary account identifier chart, in accordance with one or more implementations.

FIG. 4 illustrates an exemplary account identifier chart 400, in accordance with one or more implementations. For example, if a best user is associated with a FBID (e.g., a FACEBOOK account identifier), and only a best FBID is found (e.g., best IGID is null), then only the FBID is output. If the best user has a FBID, and is hard matched to an IGID, the FBID is output. If the best user has a FBID, and is not hard matched to an IGID, then both the FBID and the IGID are output (e.g., multi-ID). If the best user is a hard matched IGID, and the best FBID is determined from the hard matched IGID, then the FBID is output. If the best user is a non-hard matched IGID, and the FBID is determined, then both the FBID and the IGID are output (e.g., multi-ID). If the best user is an IGID, and no best FBID is determined, then the IGID is output.

According to aspects, the ID outputs may be utilized for associating with a user account for directed advertising. For example, the FBID may be a first type identifier, and the IGID may be a second type identifier. Both the first type identifier and the second type identifier may be first-class citizens. In an implementation, identifiers may be determined based on user information. For example, the user information may include contact information, phone numbers, addresses, etc.

Figure 5:
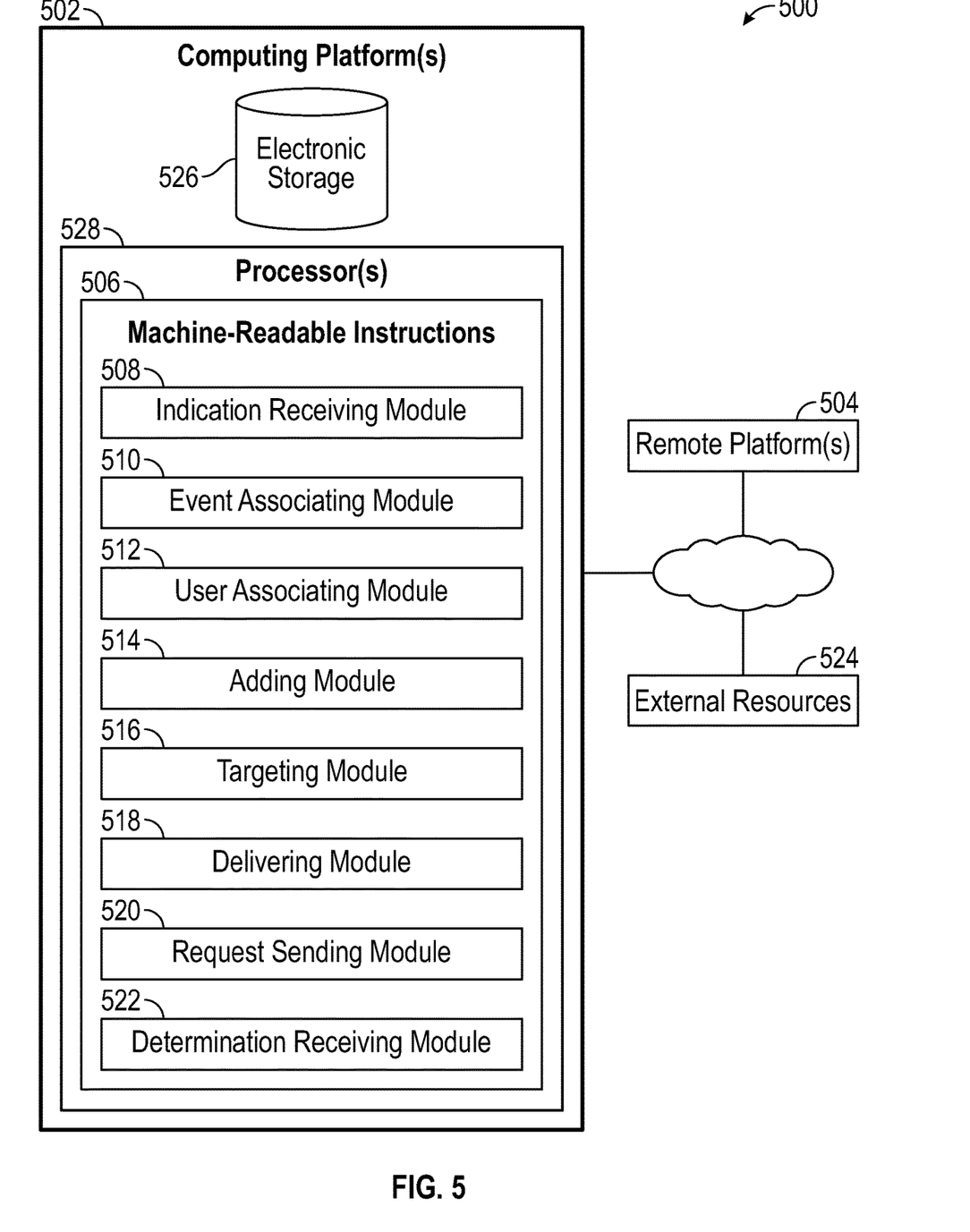
FIG. 5 illustrates a system configured for assigning multiple identifiers to user accounts, in accordance with one or more implementations.

FIG. 5 illustrates a system configured for assigning multiple identifiers to user accounts, in accordance with one or more implementations. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of indication receiving module 508, event associating module 510, user associating module 512, adding module 514, targeting module 516, delivering module 518, request sending module 520, determination receiving module 522 and/or other instruction modules.

Indicating receiving module 508 may be configured to receive an indication of an event.

Event associating module 510 may associate the event with a user.

User associating module 512 may associate the user with at least a first account identifier of a plurality of accounts of the user. The user associating module 512 may also associate the user with at least a second account identifier of the plurality of accounts of the user, the second account identifier different than the first account identifier.

Adding module 514 may add at least one of the first account identifier or the second account identifier to a custom audience relating to the event.

Targeting module 516 may target the custom audience through directed advertising.

Delivering module 518 may deliver ads to the custom audience.

Request sending module 520 may send a request for determining a best candidate.

Determination receiving module 522 may receive the determination of the best candidate.

In some implementations, computing platform(s) 502, remote platform(s) 504, and/or external resources 524 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 524 may be operatively linked via some other communication media.

A given remote platform 504 may include one or more processors configured to execute computer program modules. The computer program modules may be configured to enable an expert or user associated with the given remote platform 504 to interface with system 500 and/or external resources 524, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 524 may include sources of information outside of system 500, external entities participating with system 500, and/or other resources. In some implementations, some or all of the functionality attributed herein to external resources 524 may be provided by resources included in system 500.

Computing platform(s) 502 may include electronic storage 524, one or more processors 526, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 524 may comprise non-transitory storage media that electronically stores information. The electronic storage media of electronic storage 524 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 524 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 524 may include one or more virtual storage resources (e.g., cloud storage, a virtual private network, and/or other virtual storage resources). Electronic storage 524 may store software algorithms, information determined by processor(s) 526, information received from computing platform(s) 502, information received from remote platform(s) 504, and/or other information that enables computing platform(s) 502 to function as described herein.

Processor(s) 526 may be configured to provide information processing capabilities in computing platform(s) 502. As such, processor(s) 526 may include one or more of a digital processor, an analog processor, a digital circuit designed to process information, an analog circuit designed to process information, a state machine, and/or other mechanisms for electronically processing information. Although processor(s) 526 is shown in FIG. 5 as a single entity, this is for illustrative purposes only. In some implementations, processor(s) 526 may include a plurality of processing units. These processing units may be physically located within the same device, or processor(s) 526 may represent processing functionality of a plurality of devices operating in coordination. Processor(s) 526 may be configured to execute modules 508, 510, 512, 514, 516, 518, and/or 520, and/or other modules. Processor(s) 526 may be configured to execute modules 508, 510, 512, 514, 516, 518, 520, and/or 522, and/or other modules by software; hardware; firmware; some combination of software, hardware, and/or firmware; and/or other mechanisms for configuring processing capabilities on processor(s) 526. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, and/or 522 are illustrated in FIG. 5 as being implemented within a single processing unit, in implementations in which processor(s) 526 includes multiple processing units, one or more of modules 508, 510, 512, 514, 516, 518, 520, and/or 522 may be implemented remotely from the other modules. The description of the functionality provided by the different modules 508, 510, 512, 514, 516, 518, 520, and/or 522 described below is for illustrative purposes, and is not intended to be limiting, as any of modules 508, 510, 512, 514, 516, 518, 520, and/or 522 may provide more or less functionality than is described. For example, one or more of modules 508, 510, 512, 514, 516, 518, 520, and/or 522 may be eliminated, and some or all of its functionality may be provided by other ones of modules 508, 510, 512, 514, 516, 518, 520, and/or 522. As another example, processor(s) 526 may be configured to execute one or more additional modules that may perform some or all of the functionality attributed below to one of modules 508, 510, 512, 514, 516, 518, 520, and/or 522.

Some embodiments described herein make use of data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
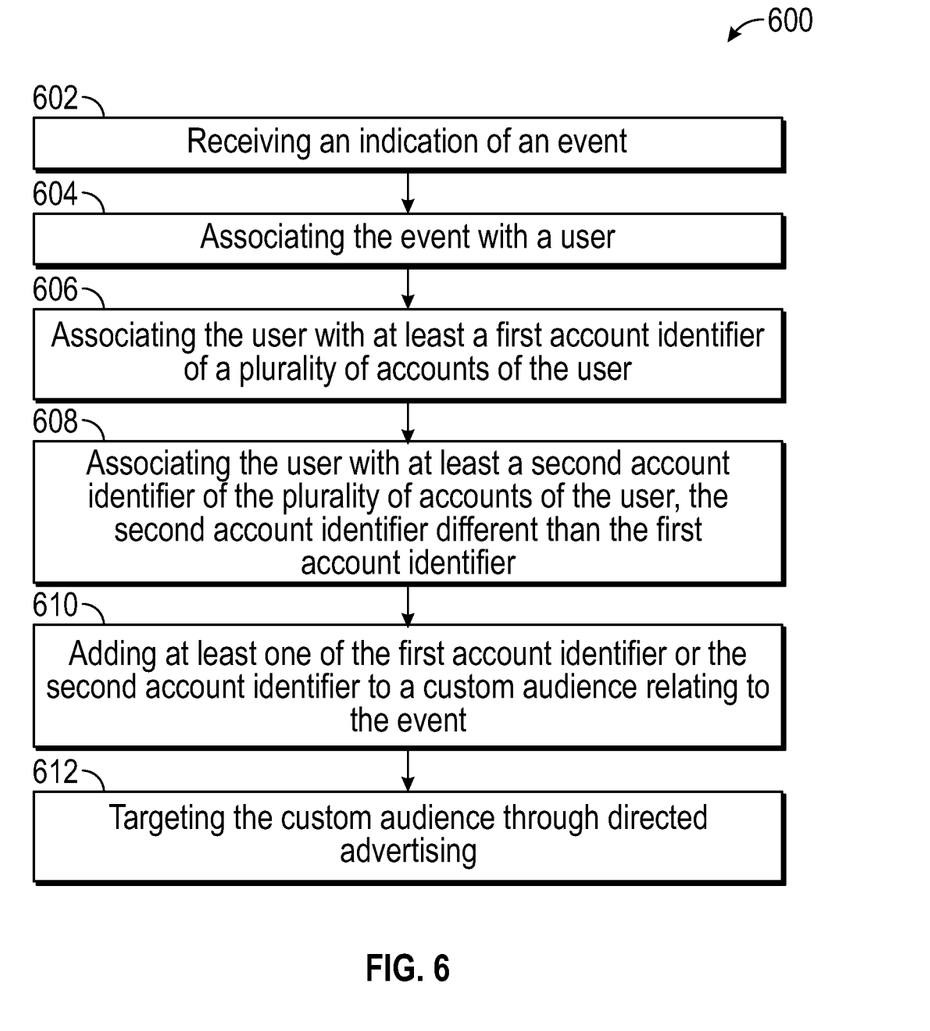
FIG. 6 illustrates an example flow diagram for assigning multiple identifiers to user accounts, according to certain aspects of the disclosure.

FIG. 6 illustrates an example flow diagram (e.g., process 600) for assigning multiple identifiers to user accounts, according to certain aspects of the disclosure. For explanatory purposes, the example process 600 is described herein with reference to FIGS. 1-4. Further for explanatory purposes, the steps of the example process 600 are described herein as occurring in serial, or linearly. However, multiple instances of the example process 600 may occur in parallel.

For purposes of explanation of the subject technology, the process 600 will be discussed in reference to FIGS. 1-4.

At step 602, the process 600 may include receiving an indication of an event. At step 604, the process 600 may include associating the event with a user. At step 606, the process 600 may include associating the user with at least a first account identifier of a plurality of accounts of the user. At step 608, the process 600 may include associating the user with at least a second account identifier of the plurality of accounts of the user, the second account identifier different than the first account identifier. At step 610, the process 600 may include adding at least one of the first account identifier or the second account identifier to a custom audience relating to the event. At step 612, the process 600 may include targeting the custom audience through directed advertising.

For example, as described above in relation to FIGS. 1-4, at step 602, the process 600 may include receiving an indication of an event (e.g., event 108, 210). At step 604, the process 600 may include associating the event with a user (e.g., candidate list 304). At step 606, the process 600 may include associating the user with at least a first account identifier (e.g., identifier 400) of a plurality of accounts of the user. At step 608, the process 600 may include associating the user with at least a second account identifier (e.g., identifier 400) of the plurality of accounts of the user, the second account identifier different than the first account identifier. At step 610, the process 600 may include adding at least one of the first account identifier or the second account identifier to a custom audience (e.g., first grouping 206, second grouping 208) relating to the event. At step 612, the process 600 may include targeting the custom audience through directed advertising (e.g., targeting 220, ranking 222, delivery 238).

According to an aspect, the process 600 may further include delivering advertisements (e.g., ads) to the custom audience. According to an aspect, the event may include a pixel event.

According to an aspect, the event may include an onsite event or an offsite event. According to an aspect, the plurality of accounts are from a family of accounts.

According to an aspect, the process 600 may further include sending a request for determining a best candidate. According to an aspect, the process 600 may further include receiving the determination of the best candidate.

According to an aspect, the account identifier may include a first type identifier or a second type identifier. According to an aspect, both the first type identifier and the second type identifier may include first-class citizens.

According to an aspect, the account identifier may include a hard matched identifier. According to an aspect, the account identifier may include a soft matched identifier.

Figure 7:
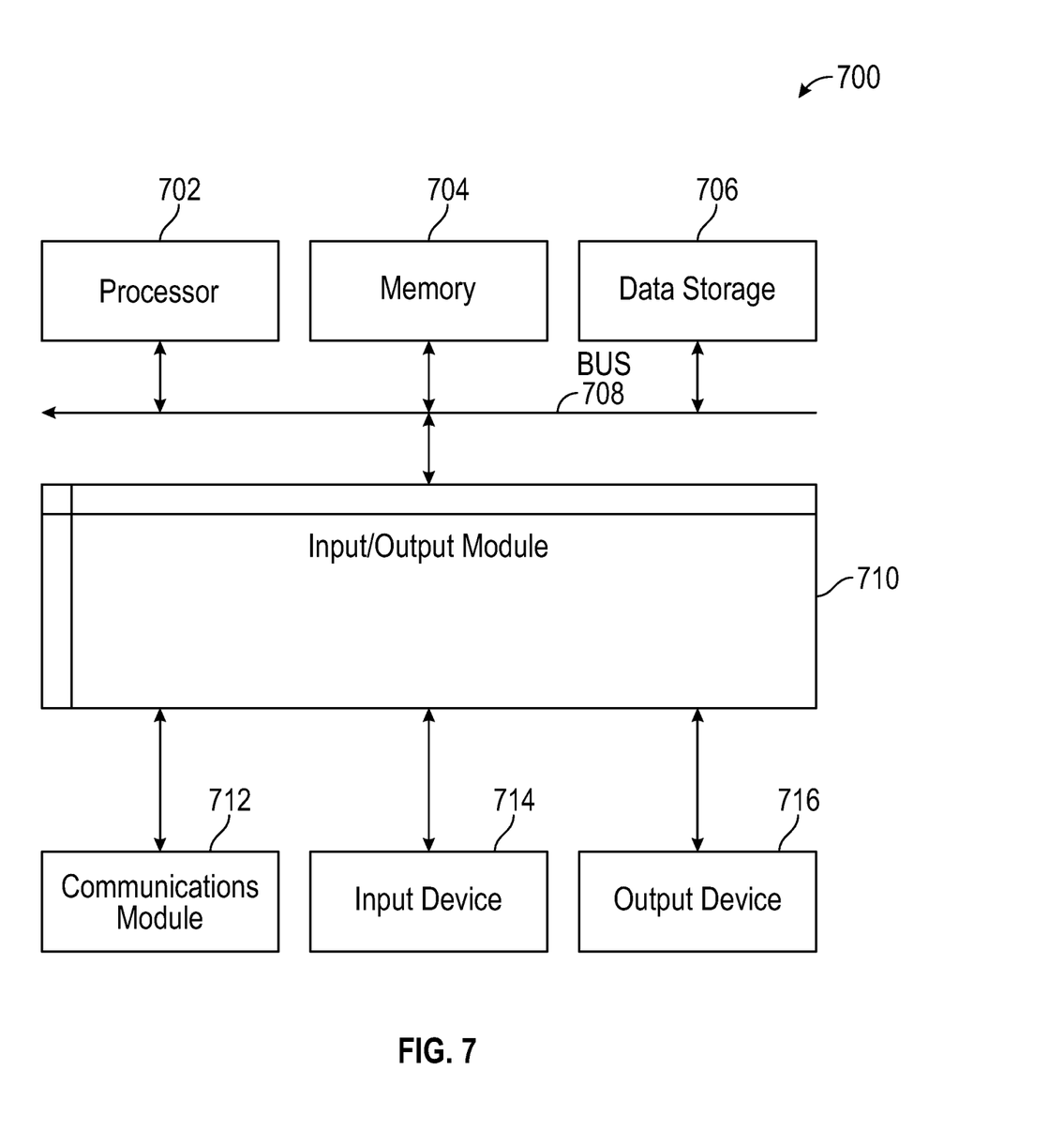
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as a LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for assigning multiple identifiers to user accounts, the method being performed by at least one processor, the method comprising:
receiving, at a server, an indication of an event on a client device;
associating the event with a user;
associating the user with at least a first account identifier of a plurality of accounts, on a plurality of applications, of the user;
associating the user with at least a second account identifier of the plurality of accounts of the user, the second account identifier different than the first account identifier, and wherein at least one of the first account identifier and the second account identifier comprises a hard matched identifier;
adding at least one of the first account identifier or the second account identifier to a custom audience relating to the event, wherein the event is separately stored in an advertisement delivery system in association with features of the plurality of accounts;
targeting the custom audience through directed advertising; and delivering, to the client device, advertisements to the custom audience via one or more of the plurality of accounts based on the advertisement delivery system.

2. The computer-implemented method of claim 1, wherein the event comprises a pixel event.

3. The computer-implemented method of claim 1, wherein the account identifier comprises a soft matched identifier.

4. The computer-implemented method of claim 1, wherein the event comprises an onsite event or an offsite event.

5. The computer-implemented method of claim 1, wherein the plurality of accounts are from a family of accounts.

6. The computer-implemented method of claim 1, wherein associating the event with the user comprises:
sending a request for determining a best candidate.

7. The computer-implemented method of claim 6, further comprising:
receiving the determination of the best candidate.

8. The computer-implemented method of claim 1, wherein the account identifier comprises a first type identifier or a second type identifier.

9. The computer-implemented method of claim 8, wherein both the first type identifier and the second type identifier comprise first-class citizens.

10. A system configured for assigning multiple identifiers to user accounts, the system comprising:
one or more hardware processors configured by machine-readable instructions to:
receive, at a server, an indication of an event on a client device;
associate the event with a user;
associate the user with at least a first account identifier of a plurality of accounts, on a plurality of applications, of the user;
associate the user with at least a second account identifier of the plurality of accounts of the user, the second account identifier different than the first account identifier, and wherein at least one of the first account identifier and the second account identifier comprises a hard matched identifier;
add at least one of the first account identifier or the second account identifier to a custom audience relating to the event, wherein the event is separately stored in an advertisement delivery system in association with features of the plurality of accounts;
target the custom audience through directed advertising; and
deliver, to the client device, advertisements to the custom audience via one or more of the plurality of accounts based on the advertisement delivery system.

11. The system of claim 10, wherein the event comprises a pixel event.

12. The system of claim 10, wherein the account identifier comprises a soft matched identifier.

13. The system of claim 10, wherein the event comprises an onsite event or an offsite event.

14. The system of claim 10, wherein the plurality of accounts are from a family of accounts.

15. The system of claim 10, wherein the one or more hardware processors are further configured by machine-readable instructions to:
send a request for determining a best candidate.

16. The system of claim 15, wherein the one or more hardware processors are further configured by machine-readable instructions to:
receive the determination of the best candidate.

17. The system of claim 10, wherein the account identifier comprises a first type identifier or a second type identifier.

18. A non-transient computer-readable storage medium having instructions embodied thereon, the instructions being executable by one or more processors to perform a method for assigning multiple identifiers to user accounts, the method comprising:
receiving, at a server, an indication of an event on a client device;
associating the event with a user;
associating the user with at least a first account identifier of a plurality of accounts, on a plurality of applications, of the user;
associating the user with at least a second account identifier of the plurality of accounts of the user, the second account identifier different than the first account identifier, and wherein at least one of the first account identifier and the second account identifier comprises a hard matched identifier;
adding at least one of the first account identifier or the second account identifier to a custom audience relating to the event, wherein the event is separately stored in an advertisement delivery system in association with features of the plurality of accounts;
targeting the custom audience through directed advertising; and
delivering, to the client device, advertisements to the custom audience via one or more of the plurality of accounts based on the advertisement delivery system.

* * * * *